Fig. 5.

Patented June 24, 1930

1,765,846

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

MACHINE FOR SEVERING COMPOSITE GLASS AND THE LIKE

Application filed February 23, 1929. Serial No. 341,988.

The invention relates to apparatus for severing sheets of composite glass and the like, and more particularly in cases where it is necessary to cut the sheets on a curve, such as is the case with the lower edge of the ordinary windshield. The curvature required is ordinarily irregular, the radius of curvature for the major portion of the cut being relatively large, while that for the ends of the cut is much shorter, and the object of the present invention is to provide a simple, easily operated machine for cutting curves of the character specified. A further object is the provision of a machine in which the plate of glass or other material to be cut is supported securely on both sides of the line of cut, so that vibration in the plate is reduced to a minimum, with a corresponding reduction in the amount of breakage and chipping. Certain embodiments of the invention are illustrated in the accompanying drawings, wherein:

Figure 1:
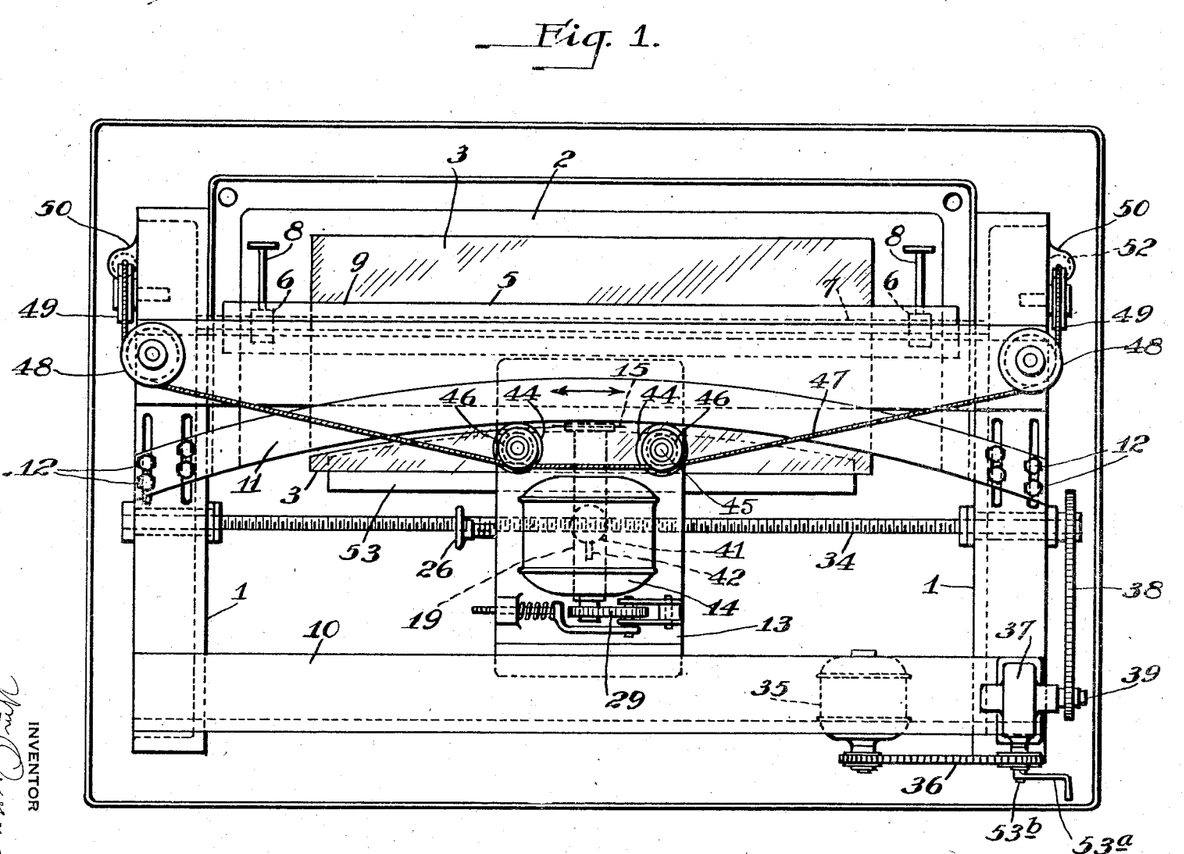
Figure 1 is a plan view of the preferred form of machine.
Figure 2:
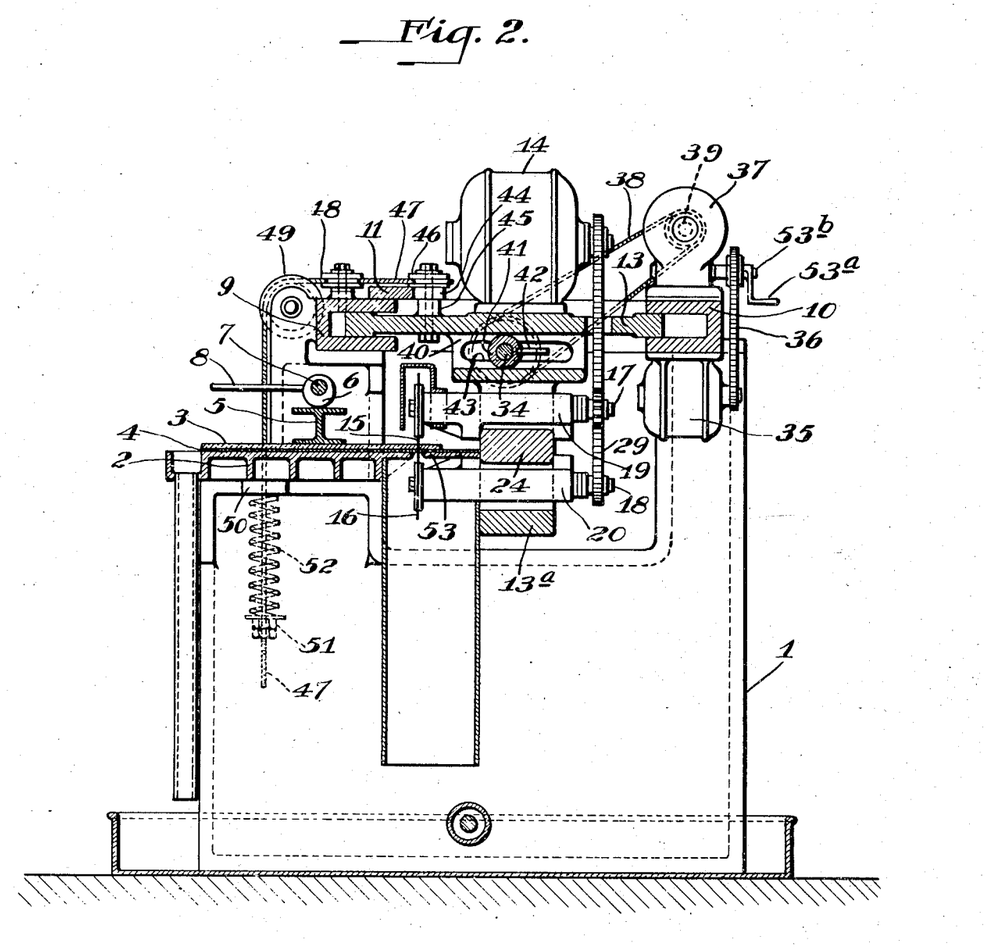
Fig. 2 is a section on the line II—II of Fig. 3.
Figure 3:
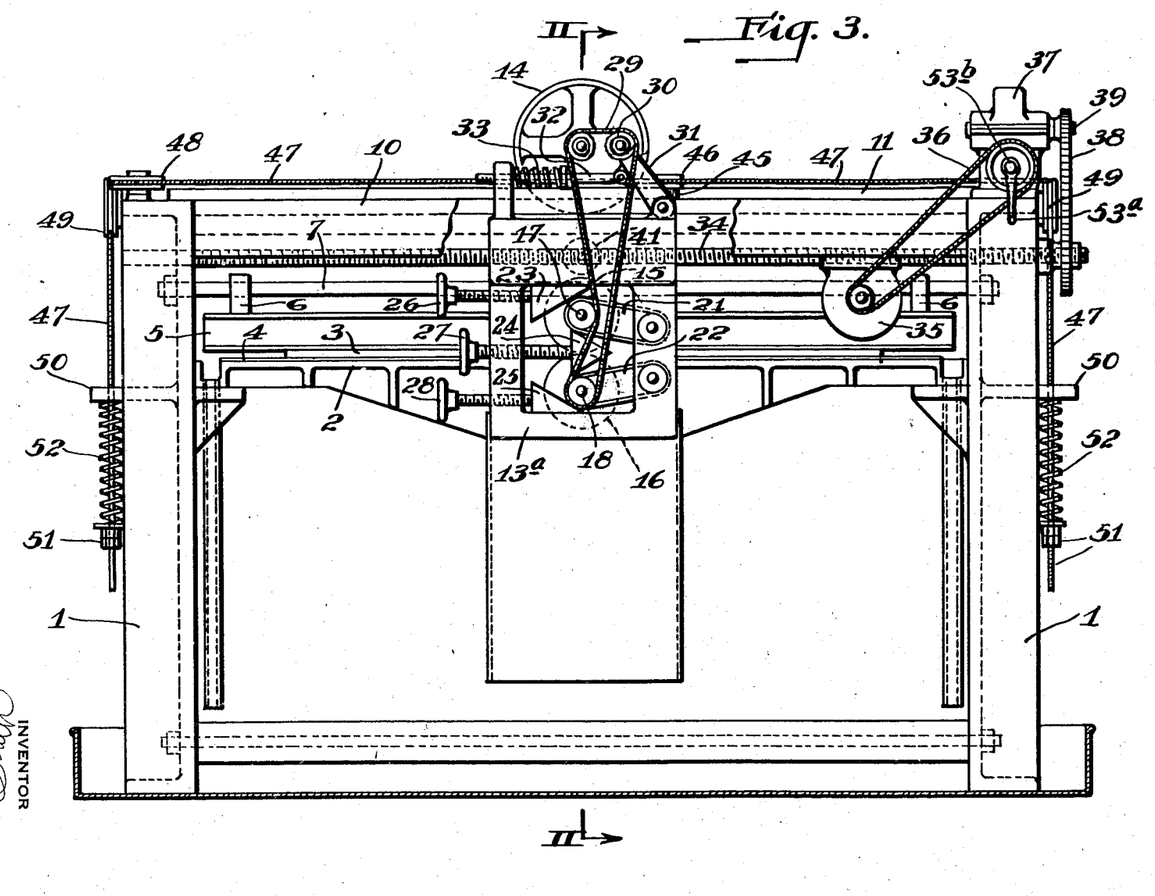
Fig. 3 is a side elevation.

Referring to Figs. 1 to 3, 1 is the framework of the machine provided as one side with the table 2 (Fig. 2) for carrying the sheet 3, whose edge is to be cut along a curved line, the sheet in this particular case being of composite glass for use in a windshield. The table has its upper surface provided with a cushioning sheet 4 of felt against which the glass sheet is clamped by means of the beam 5, such beam being forced down by a pair of eccentric cams 6, 6, mounted on the shaft 7 and operated by the levers 8, 8.

The upper portion of the frame is provided with a pair of guideways 9 and 10 of U-shape in cross section (Fig. 2), such guideways serving to slidably support the carriage on which the cutting discs, as later described, are mounted. These guideways permit the carriage to move longitudinally of the table 2 and also transversely thereof so that the cutting discs may follow the curved path necessary in order to cut the desired contour at the edge of the glass sheet. Mounted on the frame just above the guideway 9 is the template or cam 11, such template being secured at its ends to the frame by means of the bolts 12 (Fig. 1) extending through slots in the end frame members so as to permit of an adjustment. This template acts as a guide for the carriage and its contour governs the line of cut of the cutting discs.

The carriage comprises a plate 13 (Fig. 2) upon which is mounted a motor 14, such plate lying with its edges in the guideways 9 and 10 in sliding contact therewith, so that the carriage may be moved longitudinally of the table 2 and also transversely thereof. The cutting of the sheet is accomplished by the disc wheels 15 and 16 located in opposition to each other and supported from the carriage as indicated in Figs. 2 and 3. The discs are carried by axles 17 and 18 journaled in bearings 19 and 20 at the ends of the swinging arms 21 and 22 (Fig. 3) carried by a part 13ª of the carriage frame, which depends from the plate 13. This provides for an adjustment of the cutting wheels toward and from each other to compensate for wear. This adjustment is accomplished by the use of three wedge shaped blocks 23, 24 and 25 adjustable in and out by means of the screws 26, 27 and 28 extending through the part 13ª of the carriage frame and swivelled at their inner ends to the blocks. The block 24 lies between the bearings 19 and 20 and when moved to the right serves to separate the bearings and the cutting wheels. When the blocks 23 and 25 are adjusted to the right, they move the bearings and the cutting wheels toward each other, the block 24 being moved to the left at such time to permit the bearings to move toward each other. The axles 17 and 18 are provided at their right hand ends (Fig. 2) with sprockets around which pass the drive chain 29, such chain also passing around a sprocket on the shaft of the motor 14. A tightener for the chain is provided in the form of a sprocket 30 carried by the swinging arm 31, such arm being yieldingly pushed to the right (Fig. 3) by the rod 32 and spring 33. The cutting wheels or discs are of thin abrading material, such as bakelite, carrying finely divided carborundum.

The carriage is moved back and forth longitudinally of the table 2 by a feed screw 34 driven from the motor 35 through the intermediary of the chain 36, reduction gearing in the casing 37 and the chain 38 passing around sprockets on the shaft 39 of the gear reducer and feed screw 34. The carriage plate 13 is provided on its lower side with a guideway 40 (Fig. 2), circular in cross section in which is slidably mounted a ball feed nut 41, such nut being held against rotation by a pin 42 screwed into the side of the ball. The feed screw 34 is threaded through the ball nut and extends through the slot 43 in the carriage plate 13. This arrangement provides for feeding the carriage longitudinally of the screw and the table 2, and at the same time permits the carriage to move transversely of the screw and table in following the curvature of the template or cam 11.

The carriage is guided along the template by the rollers 44, 44 mounted for rotation on the vertical pins 45, 45 mounted upon the plate 13. The pins 45, 45 each carry a sheave 46 located above the roller (Fig. 1) over which passes the cable 47. The cable 47 extends around the sheaves 48 and 49 at each end of the frame, and then downward through the lugs 50, 50 (Fig. 1). The ends of the cable are provided with nuts 51, 51 (Fig. 2) and between these nuts and the lugs 50, 50 are interposed the springs 52, 52, such springs serving to maintain the cable under tension, so that the rollers 44, 44 are at all times pressed tightly against the edge of the template 11. The axes of rotation of the cutting discs are by this means maintained normal with respect to the curve of the template and the width of the slot cut by the discs is of uniform width throughout and of a minimum width. A shelf 53 serves to support the strip of glass which is cut by the disc from the body of the sheet. A handle 53$^a$ applied to the shaft 53$^b$ is utilized in positioning the carriage preliminary to starting the feed of the carriage from the motor 35.

In operation, the glass sheet 3, whose edge is to be cut to a curvature corresponding to that of the template 11, is clamped to the table by the beam 5 with its right hand edge positioned in proper position with respect to the cutting discs 15 and 16. The cut is started at the end of the sheet and the carriage is moved along by means of the feed screw 34 driven from the motor 35, as heretofore described. During this movement, the cable 49 holds the carriage yieldingly to the left (Fig. 1) so that the two rollers 44, 44 engage the edge of the template 11. The carriage, and the parts carried thereby, including the cutting discs 15, 16, therefore, follow the curvature of the template and the edge of the sheet is cut to correspond. The discs 15 and 16 are preferably adjusted so that they just clear each other so that a thin fin of the center sheet (celluloid or pyralin) is left intact after the cutting operation, which fin may be cut with a knife or torn apart. A substantial advantage is involved in locating the cutting discs below (instead of above) the level of the guideways 9 and 10 and the template 11, as these parts are thus protected from the water used with the discs and from the cuttings from the discs. The use of the template 11 in conjunction with the cable 47 also involves an advantage over a slotted cam guide or template, as the cost is less, and the operation is more accurate, due to the fact that there is no lost motion, such as occurs after a short period of use and wear where a slotted cam guide is employed.

Figure 4:
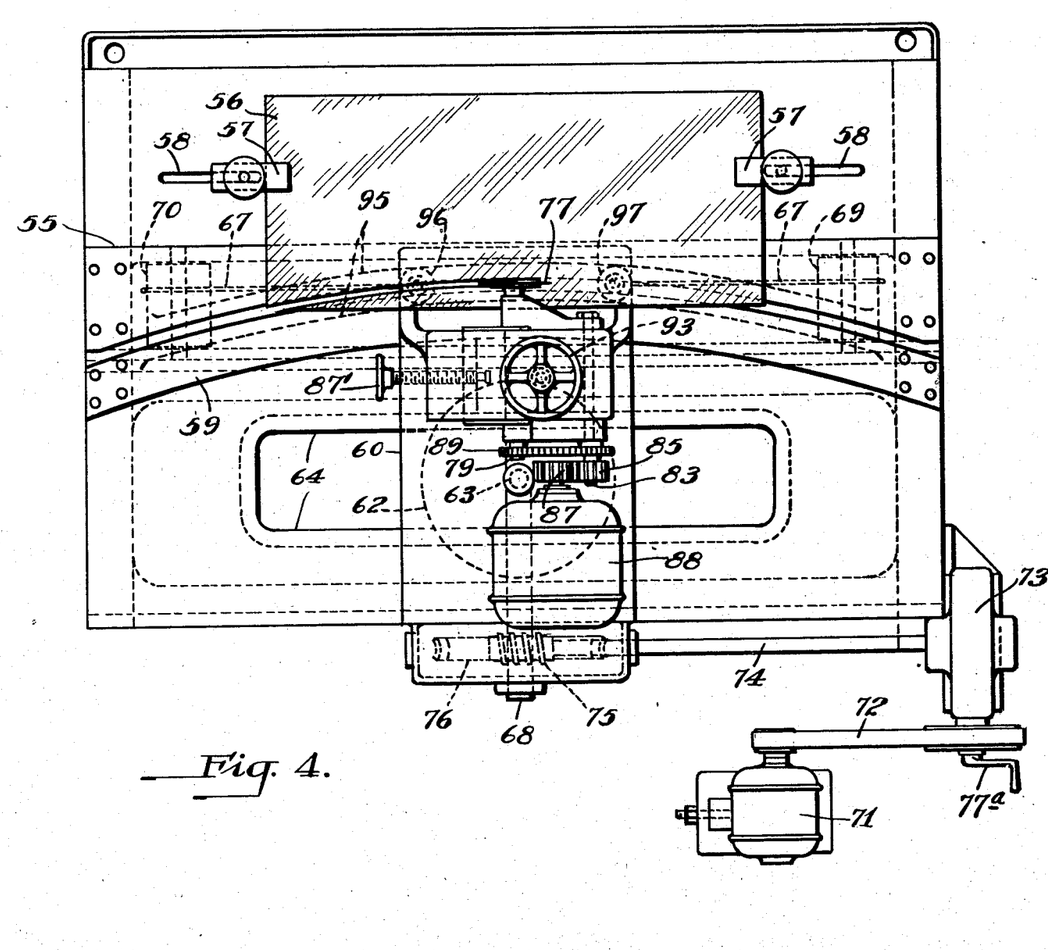
Fig. 4 is a plan view of a modification.
Figure 5:
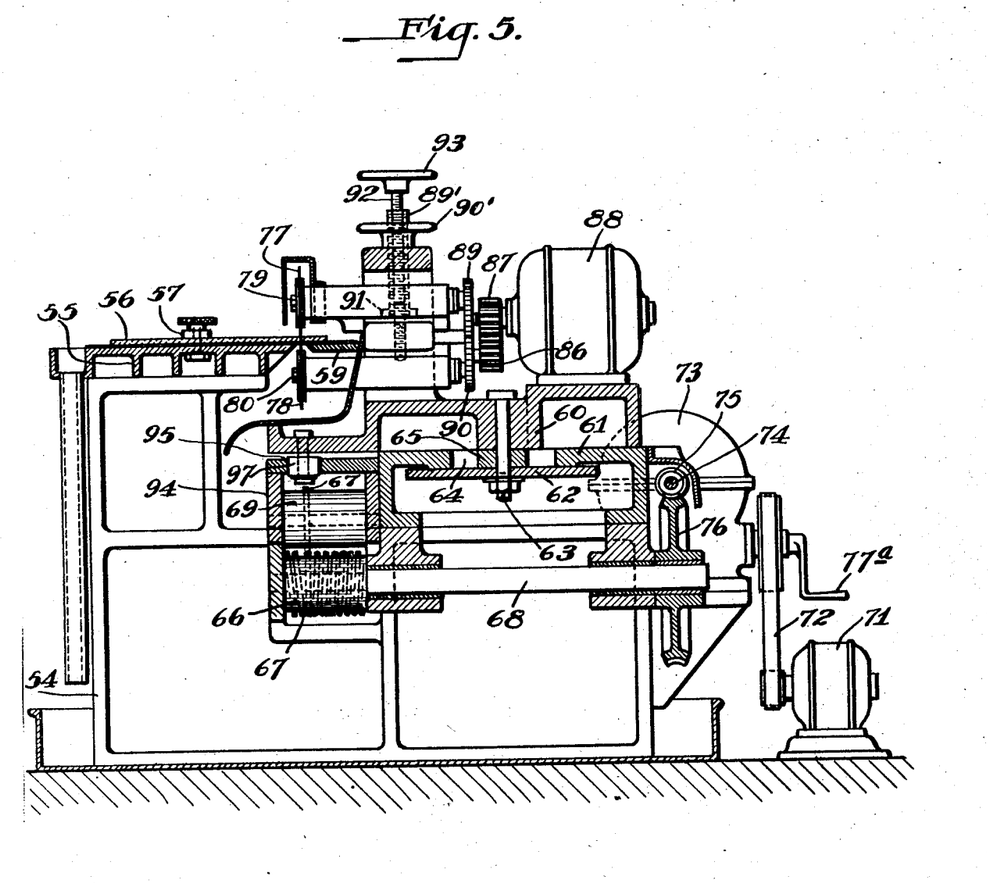
Fig. 5 is a section on the line V—V of Fig. 6.
Figure 6:
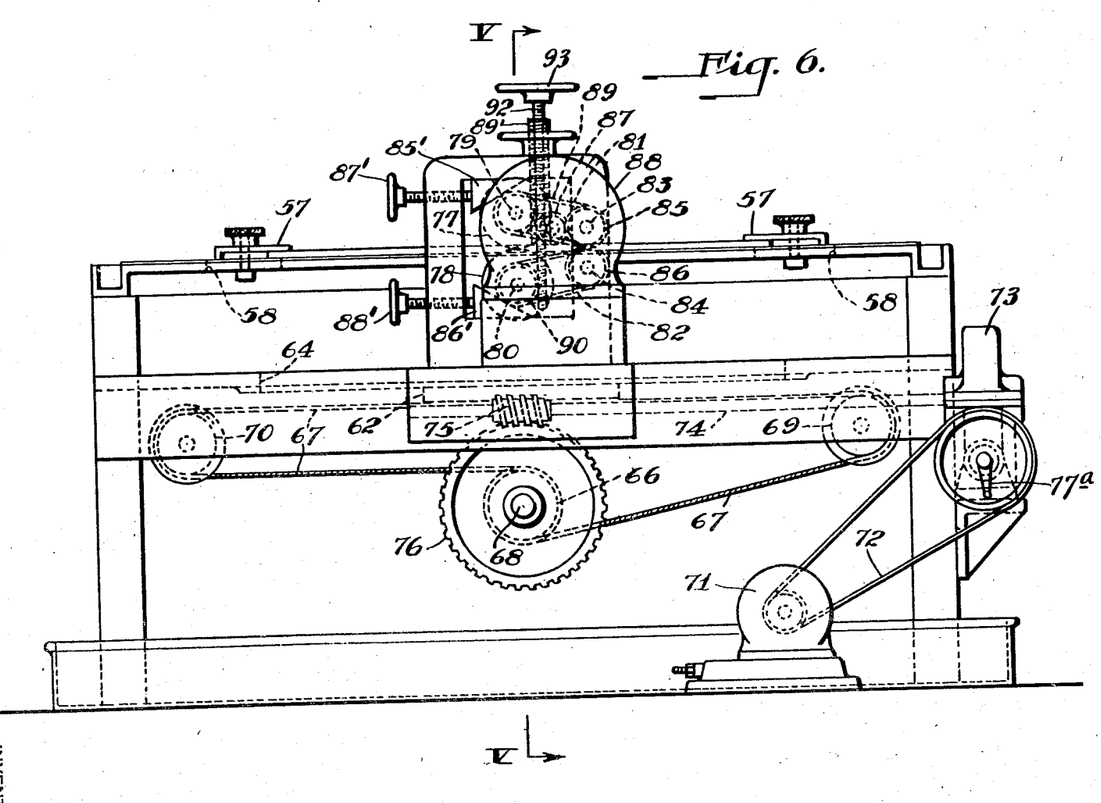
Fig. 6 is a side elevation.

Figs. 4, 5 and 6 illustrate a modified form of machine having the same general mode of operation as the machine of Figs. 1, 2 and 3, but structurally different in detail and less desirable. In this machine a slotted cam or template guide, as above referred to, is employed instead of the template and cable construction of Figs. 1, 2 and 3, and such cam or template, as well as the guide devices for slidably supporting the carriage, are located below the level of the cutting discs instead of above, as in the Figs. 1 to 3 construction.

Referring to Figs. 4, 5 and 6, 54 is the frame of the machine provided at one side with a felt covered table 55 for supporting the glass sheet 56, such sheet being held firmly to the table by the clamps 57 having bolts extending through slots 58 in the table. As in the other construction, a shelf 59 is provided for supporting the glass strip which is cut from the sheet 56. The carriage consists of a casting 60 slidably supported on the bed plate 61 of the frame. A circular clamping plate 62 is located beneath the bed plate 61 and secured to the carriage by the bolt 63, a slot 64 being provided in the bed plate to give the necessary clearance around the bolt 63 and the spacing block 65 when the carriage moves longitudinally and transversely of the table 55 during the cutting operation.

A drum 66 and cable 67 are employed to give the table its movement longitudinally of the table, the drum being mounted on a shaft 68 journalled in the frame beneath the carriage, as indicated in Fig. 5. The cable has a number of turns around the drum, and its ends lead from the drum around the pulleys 69 and 70 (Fig. 6) also carried by the frame, such ends being attached to the carriage so that the carriage may be moved back and forth by rotating the drum first in one direction and then in the other. Provision is made for rotating the drum from the motor 71, the drive including the belt 72, reduction gearing in the casing 73, the shaft 74 leading from the reduction gearing, the worm 75 on the shaft 74 and the worm wheel 76 on the shaft 68 which carries the drum. The hand crank 77ª corresponds in function to the handle or crank 53ª, heretofore referred to in connection with the Figs. 1 to 3 construction.

The cutting discs 77 and 78 are carried by shafts 79 and 80 journalled in the swinging arms 81 and 82 (Fig. 6) mounted on the pivots 83 and 84. Journalled on the ends of the pivots are a pair of spur gears 85 and 86 (Fig. 6) meshing together and one of these gears is driven by a pinion 87 on the shaft of the motor 88 carried by the casting 60. The hubs of the gears 83 and 84 are provided with sprockets around which pass the chains 89 and 90, such chains also passing around sprockets on the ends of the shafts 79 and 80 which carry the cutting discs. The swinging arms 81 and 82 are engaged for adjustment toward each other by the wedges 85' and 86' operated by the screws 87' and 88'. The arm 81 is pulled up against the wedge 85' by the sleeve 89' threaded exteriorly and engaged by the hand wheel 90'. This sleeve extends through the arm 81 and has its end provided with a flange 91 (Fig. 5) which engages the lower side of the arm. Similarly, the arm 82 is clamped down against the wedge 86 by the rod 92, which is threaded through the sleeve 89' and provided at its upper end with the hand wheel 93.

Bolted to the frame of the machine below the table 55 is the cam box 94 (Fig. 5) provided through its upper wall with a slot 95 corresponding in contour with the curve to be cut at the edge of the glass sheet 56. The edges of this slot are engaged by the pair of rollers 96 and 97 (Figs. 4 and 5) mounted on stub shafts projecting down from the bottom of the carriage casting 60. These rollers perform the function of the rollers 46, 46 of the Figs. 1 to 3 construction, maintaining the axis of rotation of the cutting discs normal with respect to the curvature of the cam slot and causing the carriage and cutting discs to follow the contour of the cam slot 95 as the carriage is moved longitudinally of the table 55 by the cable 67. The functional operation of the machine parallels that of the Figs. 1 to 3 construction, as heretofore described.

What I claim is:

1. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, cooperating means between the template and the carriage whereby the carriage is caused to follow the line of curvature of the template, as such carriage is moved longitudinally of the table, means for giving the carriage its movement longitudinally of the table, and a thin, driven cutting disc mounted upon the carriage in position to engage and cut said sheet.

2. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, cooperating means between the template and the carriage whereby the carriage is caused to follow the line of curvature of the template, as such carriage is moved longitudinally of the table, means for giving the carriage its movement longitudinally of the table, a motor and a thin cutting disc driven thereby mounted upon the carriage with the disc in position to engage and cut said sheet.

3. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, cooperating means between the template and the carriage whereby the carriage is caused to follow the line of curvature of the template, as such carriage is moved longitudinally of the table, means for giving the carriage its movement longitudinally of the table, and a pair of thin, driven cutting discs mounted in opposition to each other upon the carriage in position to engage and cut the sheet from both sides as the carriage is moved along the template.

4. In combination, a machine for cutting curves in sheets of hard material, comprising a fixed table adapted to support the sheet to be cut, a template extending longitudinally of the table fixed with respect thereto and having a contour corresponding to the desired line of cut, a carriage, a motor mounted upon the carriage, a thin cutting disc driven from the motor supported by the carriage in position to engage and cut said sheet, guideways for the carriage located above the level of said table and arranged to permit the carriage to move longitudinally of the table and also transversely thereof, means for moving the carriage, and cooperating means between the carriage and the template whereby the carriage is caused to follow the line of curvature of the template as the carriage is moved along the table.

5. In combination, a machine for cutting curves in sheets of hard material, comprising a fixed table adapted to support the sheet to be cut, a template extending longitudinally of the table fixed with respect thereto and having a contour corresponding to the desired line of cut, a carriage, a motor mounted upon the carriage, a thin cutting disc driven from the motor supported by the carriage in position to engage and cut said sheet, guideways for the carriage located above the level of said table and arranged to permit the carriage to move longitudinally of the table and also transversely thereof, means for moving the carriage, and cooperating means between the carriage and the template whereby the carriage is caused to follow the line of curvature of the template as the carriage is moved along the table, said template and said cooperating means also being located above the level of said table.

6. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, a thin driven cutting disc mounted upon the carriage in position to engage and cut said sheet, means on the carriage on each side of the axis of rotation of the disc engaging the template and arranged to maintain such axis of rotation normal with respect to the line of curvature of the template during the movement of the carriage along the table and means for giving the carriage a movement longitudinally of the table.

7. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, a thin driven cutting disc mounted upon the carriage in position to engage and cut said sheet, a roller on the table on each side of the axis of rotation of the disc engaging the template and arranged to maintain such axis of rotation normal with respect to the line of curvature of the template during the movement of the carirage along the table and means for giving the carriage a movement longitudinally of the table.

8. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, cooperating means between the template and the carriage whereby the carriage is caused to follow the line of curvature of the template, as such carriage is moved longitudinally of the table, means for giving the carriage its movement longitudinally of the table, and a thin driven cutting disc mounted upon the carriage in position to engage and cut said sheet, said cooperating means comprising means on the carriage engaging the template, and means for yieldingly pressing the carriage toward the template during its movement therealong.

9. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, cooperating means between the template and the carriage whereby the carriage is caused to follow the line of curvature of the template, as such carriage is moved longitudinally of the table, means for giving the carriage its movement longitudinally of the table, and a thin driven cutting disc mounted upon the carriage in position to engage and cut said sheet, said cooperating means comprising roller means on the carriage engaging the template, and means for yieldingly pressing the carriage toward the template during its movement therealong.

10. In combination, a machine for cutting curves in sheets of hard material, comprising a fixed table adapted to support the sheet to be cut, a template extending longitudinally of the table fixed with respect thereto and having a contour corresponding to the desired line of cut, a carriage mounted for movement longitudinally of the table and also transversely thereof, cooperating means between the template and the carriage whereby the carriage is caused to follow the line of curvature of the template, as such carriage is moved longitudinally of the table, means for giving the carriage its movement longitudinally of the table, and a thin driven cutting disc mounted upon the carriage in position to engage and cut said sheet, said cooperating means comprising a sheave on the carriage, a cable passing over the sheave, and means for applying yielding tension to the cable so that it presses the carriage toward the template during its movement therealong.

In testimony whereof I have hereunto subscribed my name this 22nd day of January, 1929.

WILLIAM OWEN.